United States Patent
Ding et al.

(10) Patent No.: US 9,608,519 B2
(45) Date of Patent: Mar. 28, 2017

(54) SWITCHING CONVERTER WITH ADAPTIVE OFF TIME CONTROL AND THE METHOD THEREOF

(71) Applicant: Chengdu Monolithic Power Systems Co., Ltd., Chengdu (CN)

(72) Inventors: Chuan Ding, Chengdu (CN); Tianzhu Zhang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 217 days.

(21) Appl. No.: 14/019,428

(22) Filed: Sep. 5, 2013

(65) Prior Publication Data

US 2014/0253079 A1    Sep. 11, 2014

(30) Foreign Application Priority Data

Mar. 11, 2013   (CN) .......................... 2013 1 0075986

(51) Int. Cl.
*G05F 1/00* (2006.01)
*H02M 3/156* (2006.01)

(52) U.S. Cl.
CPC .................................. *H02M 3/156* (2013.01)

(58) Field of Classification Search
USPC .................................. 323/274, 356; 363/101
See application file for complete search history.

(56) References Cited

U.S. PATENT DOCUMENTS

| | | | |
|---|---|---|---|
| 7,541,795 B1 * | 6/2009 | Smith et al. .................. | 323/285 |
| 2008/0061750 A1 * | 3/2008 | Stoichita ....................... | 323/271 |
| 2011/0193543 A1 | 8/2011 | Nguyen | |
| 2012/0007567 A1 | 1/2012 | Disney | |
| 2012/0112795 A1 | 5/2012 | Wang | |
| 2012/0235664 A1 | 9/2012 | Dong | |
| 2012/0250367 A1 * | 10/2012 | Desimone et al. ........ | 363/21.17 |
| 2013/0166947 A1 | 6/2013 | Yang | |

* cited by examiner

*Primary Examiner* — Timothy J Dole
*Assistant Examiner* — Lorena Bruner
(74) *Attorney, Agent, or Firm* — Perkins Coie LLP

(57) ABSTRACT

A switching converter having a power stage with a main switch to convert an input voltage to an output voltage; a current sense circuit generating a current sense signal indicative of a current flowing through the main switch; a PWM generator generating a PWM signal; an OFF time controller generating an OFF time control signal relating to the input voltage and the output voltage; and a logic circuit generating a switching signal based on the OFF time control signal and the PWM signal to control the main switch.

20 Claims, 7 Drawing Sheets

SWITCHING CONVERTER WITH ADAPTIVE OFF TIME CONTROL AND THE METHOD THEREOF

CROSS-REFERENCE TO RELATED APPLICATION(S)

This application claims priority to and the benefit of Chinese Patent Application No. 201310075986.4, filed Mar. 11, 2013, which is incorporated herein by reference in its entirety.

TECHNICAL FIELD

The present invention relates generally to electronic circuits, and more particularly but not exclusively to switching converter with adaptive OFF time control and the method thereof.

BACKGROUND

Switching converters are commonly used to provide electric power to many electronic devices. A transformer or an inductor is usually configured as a tank element in the switching converter. For example, an inductor is configured in a BUCK converter. A main switch is electrically coupled to the inductor. The main switch is turned ON and OFF so as to alternately store energy in the inductor and transfer the stored energy to the load.

Switching converter with peak current control has simpler system dynamics because it makes use of the available current sense information during normal operation. The main disadvantage of peak current control scheme is its susceptibility to noise in a current sense signal indicative of a current flowing through the inductor of the switching converter and to noise in the reference signal compared with the current sense signal. Thus the sub-harmonic oscillation will arise, and the switching converter with peak current control is unstable whenever the steady-state duty cycle is greater than 50%. To avoid this stability problem, the control scheme is usually modified by addition of an artificial ramp to the current sense signal.

FIG. 1 shows the waveforms of a prior art switching converter with peak current control, wherein Vs represents the current sense signal indicative of the current flowing through the inductor, Ipeak represents a current limit signal and Vsp represents the difference between the current limit signal Ipeak and the artificial ramp. As can be seen from FIG. 1, when the current sense signal Vs hits waveform Vsp, an over current condition is detected. Then the main switch is turned OFF and the current sense signal Vs decreases. Because of the existence of the artificial ramp, the actual current limit value is equal to the difference of the current limit signal Ipeak and the artificial ramp.

The present invention pertains to provide a switching converter with adaptive OFF time control which has precise current control.

SUMMARY

It is an object of the present invention to provide a switching converter with adaptive OFF time control and the method thereof.

In accomplishing the above and other objects, there has been provided, in accordance with an embodiment of the present invention, a switching converter with adaptive OFF time control comprising: a power stage comprising a main switch, the power stage being configured to convert an input voltage to an output voltage; a current sense circuit coupled to the power stage to generate a current sense signal indicative of the current flowing through the main switch; an error amplifier having a first input terminal configured to receive a feedback signal indicative of the output voltage, a second input terminal configured to receive a first reference signal, and an output terminal configured to generate a compensation signal based on the feedback signal and the first reference signal; a PWM comparator having a first input terminal coupled to the current sense circuit to receive the current sense signal, a second input terminal coupled to the output terminal of the error amplifier to receive the compensation signal, and an output terminal configured to generate a PWM signal based on the current sense signal and the compensation signal; an OFF time controller having a first input terminal configured to receive the input voltage, a second input terminal configured to receive the output voltage, and an output terminal configured to generate an OFF time control signal based on the input voltage and the output voltage to control the OFF time of the main switch; and a logic circuit having a first input terminal coupled to the output terminal of the PWM comparator to receive the PWM signal, a second input terminal coupled to the output terminal of the OFF time controller to receive the OFF time control signal, and an output terminal configured to output a switching signal based on the PWM signal and the OFF time control signal to control the main switch.

There has been provided, in accordance with an embodiment of the present disclosure, a switching converter with adaptive OFF time control, comprising: a power stage comprising a main switch, the power stage configured to convert an input voltage to an output voltage; a current sense circuit having an input terminal coupled to the main switch, and an output terminal configured to generate a current sense signal indicative of a current flowing through the main switch; a PWM generator having a first input terminal configured to receive a feedback signal indicative of the output voltage of the switching converter, a second input terminal configured to receive the current sense signal, and an output terminal configured to generate a PWM signal based on the feedback signal and the current sense signal; an OFF time controller having a first input terminal configured to receive the input voltage, a second input terminal configured to receive the output voltage, and an output terminal configured to generate an OFF time control signal based on the input voltage and the output voltage; and a logic circuit having a first input terminal coupled to the output terminal of the PWM generator to receive the PWM signal, a second input terminal coupled to the output terminal of the OFF time controller to receive the OFF time control signal, and an output terminal configured to output a switching signal based on the PWM signal and the OFF time control signal to control the main switch.

There has been provided, in accordance with an embodiment of the present disclosure, a method for controlling a switching converter, wherein the switching converter comprises a power stage having a main switch, and the power stage is configured to convert an input voltage into an output voltage, the method comprises: generating a current sense signal based on a current flowing through the main switch; generating a compensation signal based on a first reference signal and a feedback signal indicative of the output voltage; comparing the current sense signal with the compensation signal; turning OFF the main switch when the current sense signal reaches the compensation signal; generating a time threshold based on the input voltage and output voltage; and turning ON the main switch when the OFF time of the main switch reaches the time threshold.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
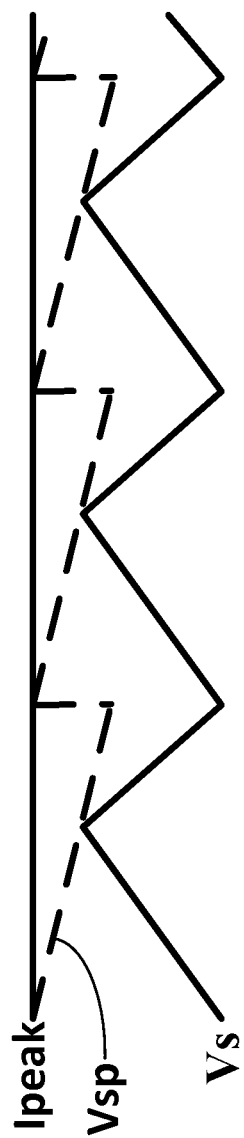
FIG. 1 shows the waveforms of a prior art switching converter with peak current control.
Figure 2:
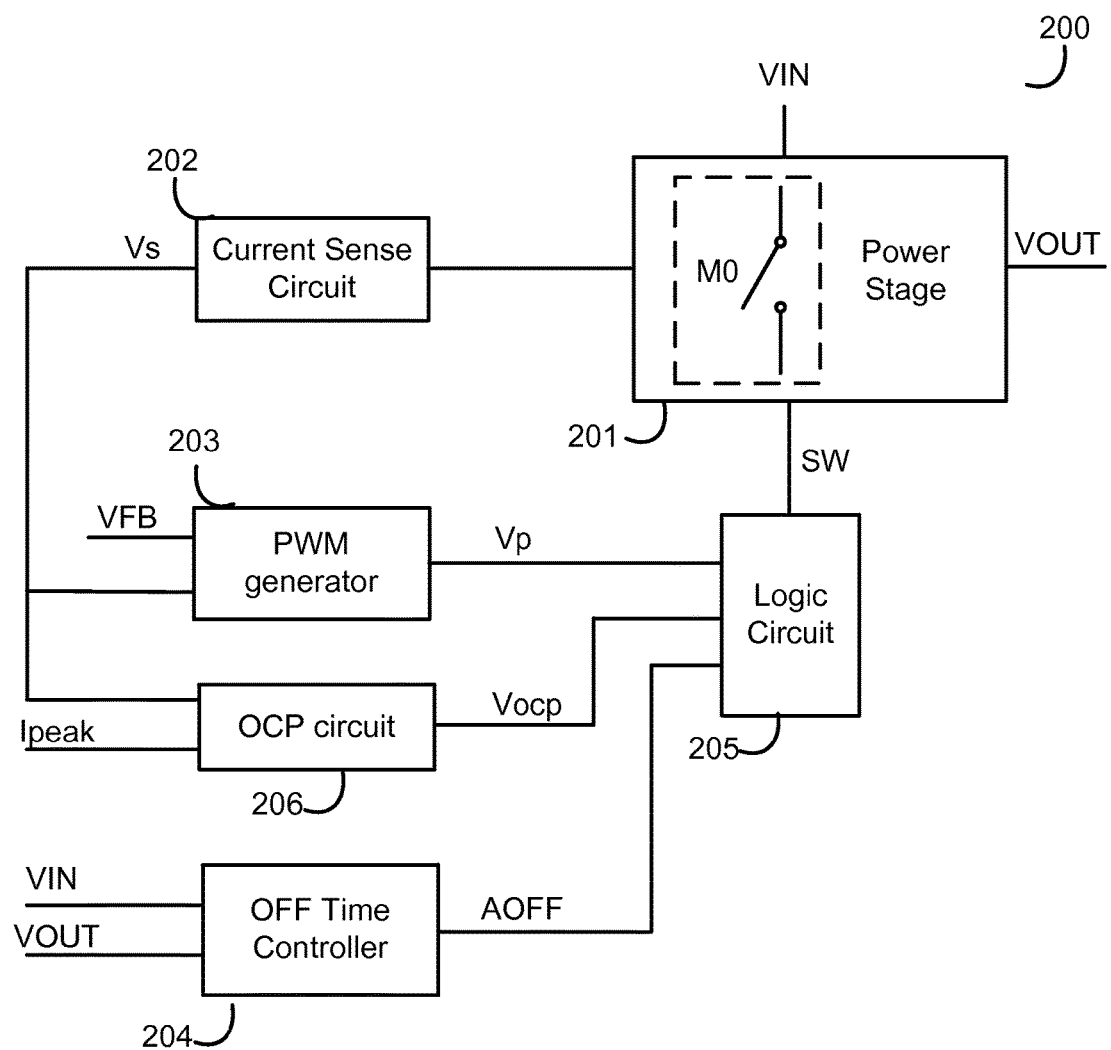
FIG. 2 shows a block diagram of a switching converter 200 in accordance with an embodiment of the present invention.

FIG. 2 shows a block diagram of a switching converter 200 in accordance with an embodiment of the present invention. The switching converter 200 comprises: a power stage 201 comprising a main switch M0, wherein the power stage 201 is configured to convert an input voltage VIN to an output voltage VOUT; a current sense circuit 202 coupled to the power stage 201 to generate a current sense signal Vs indicative of a current flowing through the main switch M0; a PWM generator 203 having a first input terminal configured to receive a feedback signal VFB indicative of the output voltage VOUT of the switching converter 200, a second input terminal configured to receive the current sense signal Vs, and an output terminal configured to generate a PWM signal Vp based on the feedback signal VFB and the current sense signal Vs; an OFF time controller 204 having a first input terminal configured to receive the input voltage VIN, a second input terminal configured to receive the output voltage VOUT, and an output terminal configured to generate an OFF time control signal AOFF based on the input voltage VIN and the output voltage VOUT; a logic circuit 205 having a first input terminal coupled to the output terminal of the PWM generator 203 to receive the PWM signal Vp, a second input terminal coupled to the output terminal of the OFF time controller 204 to receive the OFF time control signal AOFF, and an output terminal configured to output a switching signal SW based on the PWM signal Vp and the OFF time control signal AOFF to control the main switch M0.

In one embodiment, the switching converter 200 further comprises an OCP (Over Current Protection) circuit 206, wherein the OCP circuit 206 having a first input terminal configured to receive the current sense signal Vs, a second input terminal configured to receive a current limit signal Ipeak and an output terminal configured to generate an OCP signal Vocp based on the current sense signal Vs and the current limit signal Ipeak.

In one embodiment, the power stage 201 may comprise any known DC/DC topology, such as BUCK converter, BOOST converter, Flyback converter and so on. The main switch M0 in the power stage 201 may comprise any controllable semiconductor device, such as MOSFET (Metal Oxide Semiconductor Field Effect Transistor), IGBT (Isolated Gate Bipolar Transistor), BJT (Bipolar Junction Transistor) and so on.

In one embodiment, the current sense circuit 202 may utilize any known techniques to sense the current flowing through the main switch M0, such as current sensing resistors, current mirrors, current transformers and so on.

In one embodiment, the OFF time control signal AOFF sets a time threshold to control the OFF time of the main switch M0 in the power stage 201.

In one embodiment, the relationship between the OFF time of the main switch M0 and the input and output voltage may be determined based on achieving a substantially constant switching frequency. If the power stage 201 comprises a BUCK converter, the output voltage VOUT can be expressed as:

$$VOUT = D \times VIN = \frac{(T - Toff) \times VIN}{T} \quad (1)$$

wherein Toff represents the OFF time of the main switch M0, D is the duty cycle and T is the switching period. Based on EQ. (1), the OFF time Toff can be expressed as:

$$Toff = \frac{T \times (VIN - VOUT)}{VIN} \quad (2)$$

In order to obtain a substantially constant switching frequency under variable input voltage and output voltage, the OFF time Toff should be proportional to (VIN−VOUT)/VIN. That means the time threshold set by the OFF time controller 204 should be inversely proportional to the input voltage VIN and be directly proportional to the difference between the input voltage VIN and output voltage VOUT.

If the power stage 201 comprises a BOOST converter, the output voltage VOUT can be expressed as:

$$VOUT = \frac{VIN}{1-D} = \frac{T \times VIN}{Toff} \quad (3)$$

Based on EQ. (3), the OFF time Toff can be expressed as:

$$Toff = \frac{T \times VIN}{VOUT} \quad (4)$$

In order to obtain a substantially constant switching frequency under variable input voltage and output voltage, the OFF time Toff should be proportional to VIN/VOUT. That means the time threshold set by the OFF time controller 204 should be inversely proportional to the output voltage VOUT and be directly proportional to the input voltage VIN.

Persons with ordinary skill in the art can recognize that the expression of the OFF time Toff in other topologies can be achieved similarly. Since the OFF time Toff of the main switch M0 is adaptive, sub-harmonic oscillation will not arise and the artificial ramp is no longer needed in the present invention. The efficiency of the switching converter is improved, and the accuracy and stability of the over current protection are also enhanced.

Figure 3:
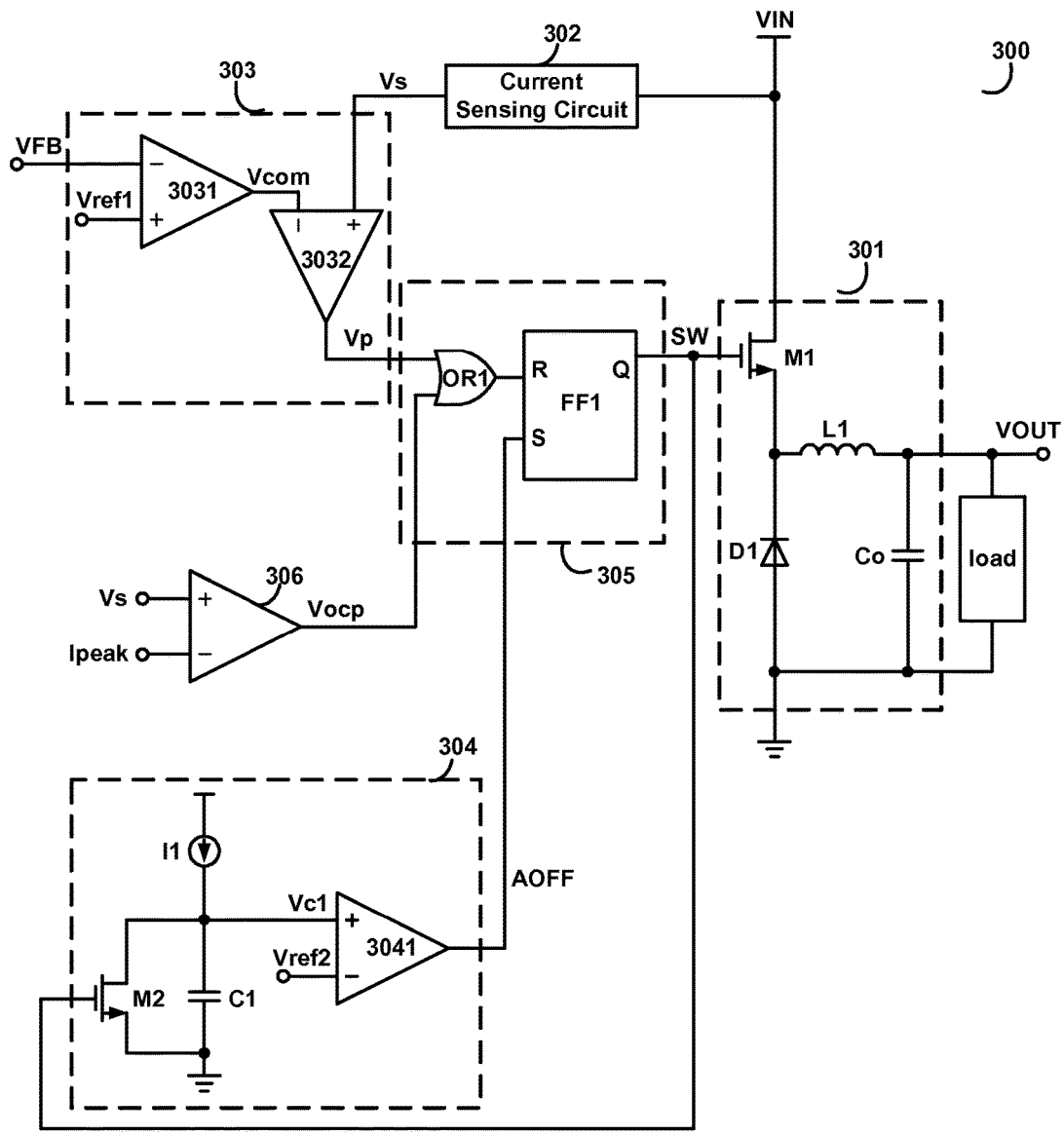
FIG. 3 schematically shows a switching converter 300 in accordance with an embodiment of the present invention.

FIG. 3 schematically shows a switching converter 300 in accordance with an embodiment of the present invention. The switching converter 300 comprises a power stage 301, a current sense circuit 302, a PWM generator 303, an OCP circuit 306, an OFF time controller 304 and a logic circuit 305.

In the example of FIG. 3, the power stage 301 may comprise a BUCK converter. The power stage 301 comprises a main switch M1, a diode D1, an inductor L1 and an output capacitor Co coupled as shown.

The PWM generator 303 comprises: an error amplifier 3031 having a first input terminal (inverting terminal) configured to receive a feedback signal VFB indicative of the output voltage VOUT, a second input terminal (non-inverting terminal) configured to receive a first reference signal Vref1, and an output terminal configured to generate a compensation signal Vcom based on the feedback signal VFB and the first reference signal Vref1; and a PWM comparator 3032 having a first input terminal (non-inverting terminal) coupled to the current sense circuit 302 to receive the current sense signal Vs, a second input terminal (inverting terminal) coupled to the error amplifier 3031 to receive the compensation signal Vcom, and an output terminal configured to generate a PWM signal Vp based on the current sense signal Vs and the compensation signal Vcom.

The OCP circuit 306 comprises a comparator having a first input terminal (non-inverting terminal) coupled to the current sense circuit 202 to receive the current sense signal Vs, a second input terminal (inverting terminal) configured to receive the current limit signal Ipeak, and an output terminal configured to generate the OCP signal based on the current sense signal Vs and the current limit signal Ipeak. The main switch M1 is turned OFF when the current sense signal Vs reaches either the compensation signal Vcom or the current limit signal Ipeak.

In one embodiment, the OFF time controller 304 comprises a first current source I1 configured to provide a charge current directly proportional to the input voltage VIN; a first capacitor C1 having a first terminal coupled to the first current source I1 to receive the charge current and a second terminal coupled to a ground reference node; a first switch M2 having a first terminal coupled to the first current source I1, a second terminal coupled to the ground reference node and a control terminal coupled to the output terminal of the logic circuit 305 to receive the switching signal SW; and an OFF time control comparator 3041 having a first input terminal (non-inverting terminal) coupled to the first terminal of the first capacitor C1, a second input terminal (inverting terminal) configured to receive a second reference signal Vref2 directly proportional to the difference between the input voltage VIN and the output voltage VOUT, and an output terminal configured to generate the OFF time control signal AOFF based on the comparison of a voltage across the first capacitor Vc1 and the second reference signal Vref2.

In one embodiment, the charge current provided by the first current source is K1×VIN, and the value of the second reference signal Vref2 is K2×(VIN−VOUT), wherein K1 and K2 are constant. The first switch M2 is turned ON by the switching signal SW when the main switch M1 is turned OFF, and is turned OFF by the switching signal SW when the main switch M1 is turned ON.

In one embodiment, the logic circuit 305 comprises: an OR gate OR1 having a first input terminal coupled to the PWM generator 303 to receive the PWM signal Vp, a second input terminal coupled to the OCP circuit 306 to receive the OCP signal Vocp, and an output terminal configured to generate a reset signal based on the PWM signal Vp and the OCP signal Vocp; and a RS flip-flop FF1 having a reset terminal coupled to the output terminal of the OR gate OR1 to receive the reset signal, a set terminal coupled to the output terminal of the OFF time controller 304 to receive the OFF time control signal AOFF, and an output terminal configured to generate the switching signal SW based on the reset signal and the OFF time control signal AOFF.

Persons of ordinary skill in the art should know that the switching converter may not include the OR gate OR1. In the switching converter without OCP circuit 306, the OR gate OR1 is omitted and the reset terminal of the RS flip-flop FF1 is coupled to the output terminal of the PWM generator 303.

During the operation of the switching converter 300, when the OFF time control signal AOFF is logical high, the RS flip-flop FF1 is set and the main switch M1 is turned ON. As a result, the input voltage VIN is supplied to the load, and the current sense signal Vs increases. When the current sense signal Vs increases to be higher than the compensation signal Vcom, the RS flip-flop FF1 is reset, and the main switch M1 is turned OFF. Then the main switch M1 will be in the OFF state for the OFF time Toff determined by the OFF time controller 304 as discussed above. The main switch M1 is turned ON again until the OFF time controller 304 provides another logical high OFF time control signal AOFF. Then the operation repeats.

Figure 4:
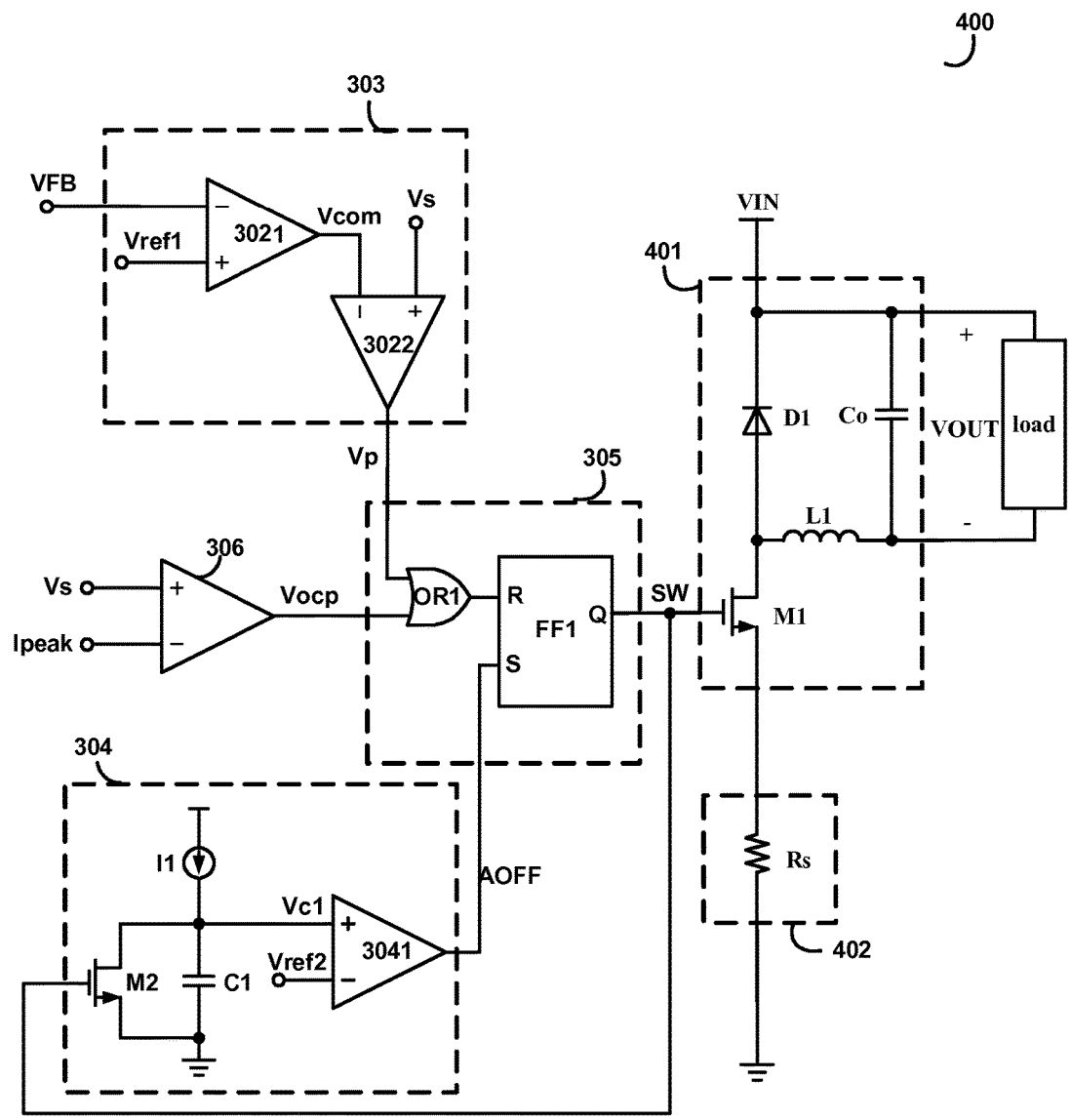
FIG. 4 schematically shows a switching converter 400 in accordance with an embodiment of the present invention.

FIG. 4 schematically shows a switching converter 400 in accordance with an embodiment of the present invention. The switching converter 400 may be applied as a hot-swap controller in a power system. Hot-swap means inserting a device into a power system or removing a device from a power system when the power system is in operation. The switching converter 400 may be coupled between the power system and the device. Once the device is plugged into the power system, the switching converter 400 starts up. During startup, the duty cycle of the main switch M1 in the switching converter 400 gradually increases from zero to 100%, so as to limit the inrush current and protect the power system as well as the device. After startup, the duty cycle of the main switch M1 remains at 100%, so that energy is transferred directly from the power system to the device.

The configuration of the switching converter 400 is similar to that of the switching converter 300 other than the detailed connection of the power stage 401. In the example of FIG. 4, the current sense circuit 402 comprises a current sensing resistor Rs coupled between the main switch M1 and the ground reference node. The voltage across the sensing resistor Rs is adopted as the current sense signal Vs.

As seen from FIG. 4, the feedback signal VFB is regulated to the first reference signal Vref1. So that the output voltage VOUT of the switching converter 400 has the similar waveform with the first reference signal Vref1. When the switching converter 400 is applied as the hot-swap controller, the output voltage VOUT is requested to increase slowly to finally reach the input voltage VIN once the device is plugged. So that the first reference signal Vref1 would gradually increase from zero. When the output voltage VOUT substantially reaches the input voltage VIN, the time derivative of the reference signal Vref1 is substantially zero, and the duty cycle of the main switch M1 is substantially 100%. Accordingly, the current flowing through the inductor L1 is substantially zero, so there will be almost no oscillation in the power stage 401 when the plug process is completed.

Figure 5:
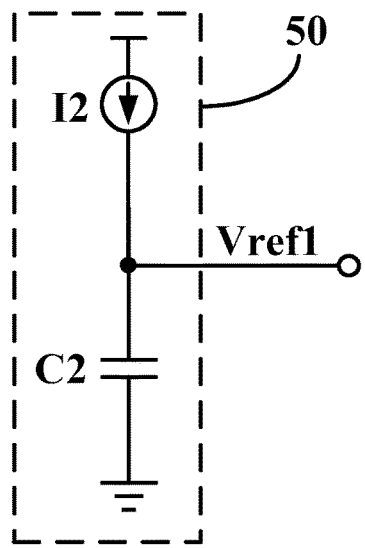
FIG. 5 schematically shows a reference generator 50 configured to generate the first reference signal Vref1 in accordance with an embodiment of the present invention.

FIG. 5 schematically shows a reference generator 50 configured to generate the first reference signal Vref1 in accordance with an embodiment of the present invention. The reference generator 50 comprises a linear signal generator having an output terminal configured to generate the first reference signal Vref1 with linear slope. The linear signal generator comprises: a second current source I2 configured to provide a charge current; and a second capacitor C2 charged by the second current source I2, and wherein the first reference signal Vref1 is equal to a voltage across the second capacitor C2.

Figure 6:
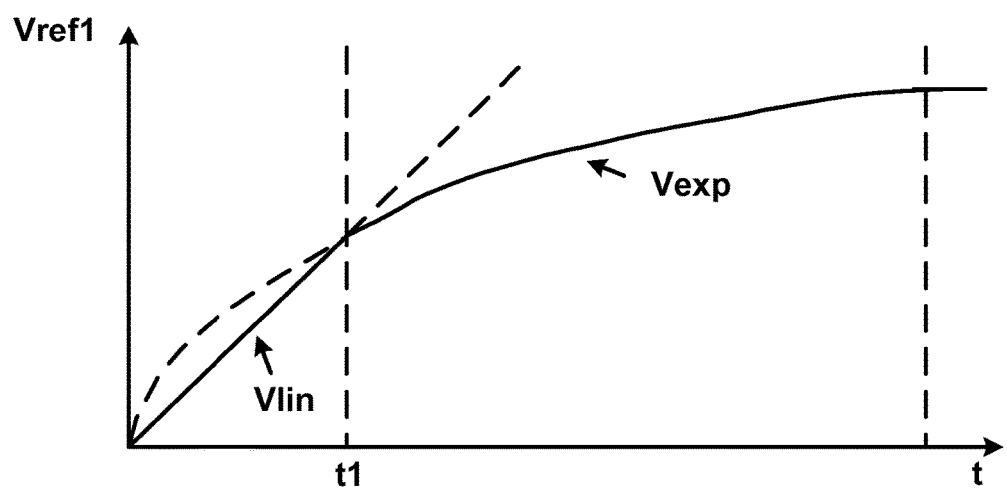
FIG. 6 shows the waveform of the first reference signal Vref1 in accordance with an embodiment of the present invention.

In one embodiment, the output voltage VOUT has a linear slew rate at beginning and an exponential ramping slew rate from a certain time t1, as shown in FIG. 6.

Figure 7:
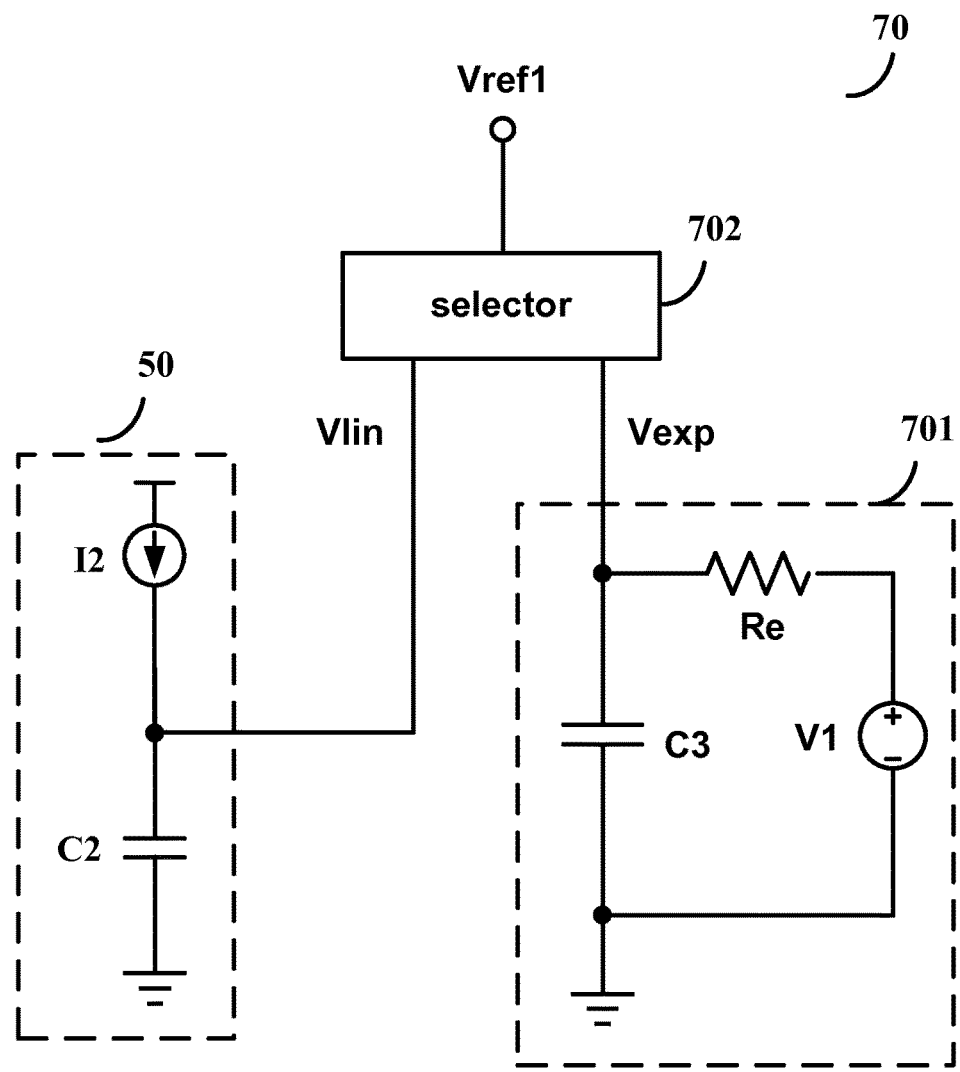
FIG. 7 schematically shows a reference generator 70 configured to generate the first reference signal Vref1 with a waveform shown in FIG. 6 in accordance with an embodiment of the present invention.

FIG. 7 schematically shows a reference generator 70 configured to generate the first reference signal Vref1 with a waveform shown in FIG. 6 in accordance with an embodiment of the present invention. The reference generator 70 comprises: an exponential signal generator 701 having an output terminal configured to generate an exponential signal Vexp; the linear signal generator 50 having an output terminal configured to generate a linear signal Vlin with linear slope; and a selector 702 having a first input terminal coupled to the output terminal of the exponential signal generator 701 to receive the exponential signal Vexp with exponential curve, a second input terminal coupled to the output terminal of the linear signal generator 50 to receive the linear signal Vlin with linear slope, and an output terminal configured to select the smaller one as the first reference signal Vref1 based on the exponential signal Vexp and the linear signal Vlin.

In one embodiment, the exponential signal generator 701 comprises: a third capacitor C3 coupled between the output terminal of the exponential signal generator 701 and the ground reference node; a voltage source V1 and a resistor Re coupled in series between the output terminal of the exponential signal generator 701 and the ground reference node. In one embodiment, the voltage provided by the voltage source V1 is related to the desired value of the output voltage.

When the switching converter 400 comprising the reference generator 70 is applied as a hot-swap controller, the operation of the switching converter 400 is as below: when the device is plugged, the switching converter 400 starts up. Then the second capacitor C2 is charged by the second current source I2, and the voltage across the second capacitor I2 increases linearly. Meanwhile, the third capacitor C3 is charged by the voltage source V1 and the resistor Re, so the voltage across the third capacitor C3 and the voltage provided by the voltage source V1 meet a following relationship:

$$Vexp + C3 \times \frac{dVexp}{dt} \times Re = V1 \quad (5)$$

$$=> Vexp = V1 - V1 \times e^{\frac{t}{C3 \times Re}}$$

wherein $$\frac{dVexp}{dt}$$

represents the time derivative of the value of the exponential signal Vexp. Above EQ. (5) shows that the exponential signal Vexp has an exponential curve.

As shown in FIG. 6, at the beginning, the linear signal Vlin is lower than the exponential signal Vexp. Accordingly, the linear signal Vlin is selected to be the first reference signal Vref1, and the output voltage VOUT has a similar waveform with the linear signal Vlin. However, as shown in FIG. 6, the exponential signal Vexp goes lower than the linear signal Vlin from time t1, so the exponential signal Vexp is selected to be the first reference signal Vref1 then, and the output voltage VOUT has a similar waveform with the exponential signal Vexp. As a result, the duty cycle of the first power switch M1 smoothly increases with the increase of the first reference signal Vref1. When the output voltage Vout substantially reaches the value of the input voltage Vin, the time derivative of the value of the first reference signal Vref1 is substantially zero, and the duty cycle of the first power switch M1 is substantially 100%. Accordingly, the current flowing through the energy storage component L1 is substantially zero.

Figure 8:
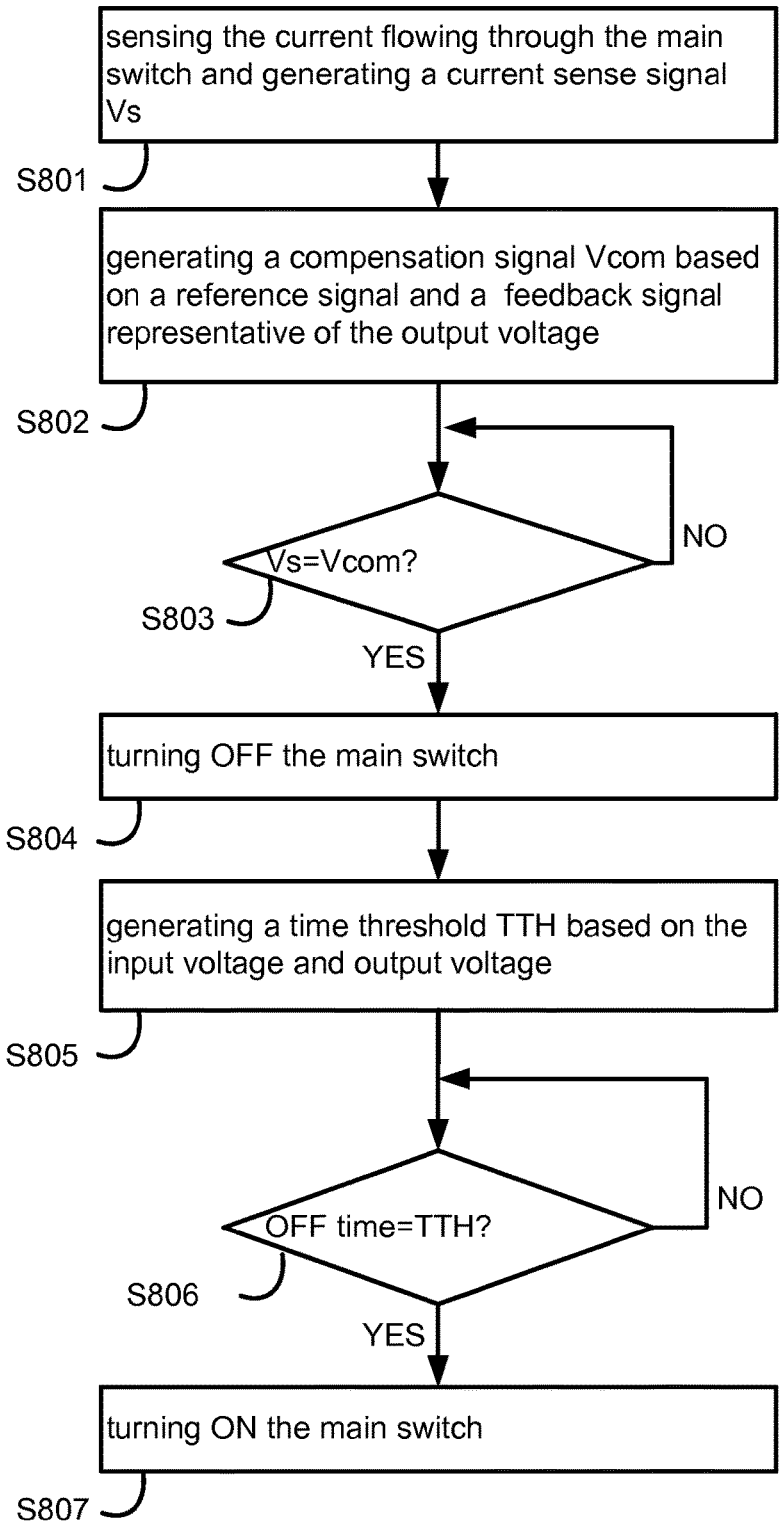
FIG. 8 shows a flowchart of a method for controlling a switching converter in accordance with an embodiment of the present invention.

FIG. 8 shows a flow chart of a method of controlling a switching converter in accordance with an embodiment of the present invention. The switching converter comprises a power stage including a main switch. The method comprises steps S801~S807.

At step S801, a current flowing through the main switch is sensed and a current sense signal Vs is generated;

At step S802, a compensation signal Vcom is generated based on a first reference signal and a feedback signal representative of an output signal of the switching converter;

At step S803, detecting whether the current sense signal reaches the compensation signal Vcom. If yes, go to step S804, else, keep detecting.

At step S804, the main switch is turned OFF.

At step S805, a time threshold TTH is generated based on the input voltage and the output voltage of the switching converter. In one embodiment, the power stage comprises a BUCK converter, the time threshold TTH is inversely proportional to the input voltage and directly proportional to the difference between the input voltage and output voltage. In another embodiment, the power stage comprises a BOOST converter, the time threshold TTH is inversely proportional to the output voltage and directly proportional to the input voltage.

At step S806, detecting whether the OFF time of the main switch reaches the time threshold TTH. If yes, go to step S807, else, keep detecting.

At step S807, the main switch is turned ON.

In one embodiment, the method further comprises: comparing the current sense signal with a current limit value; and turning OFF the main switch when the current sense signal reaches the current limit value.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A switching converter with adaptive OFF time control, comprising:
    a power stage comprising a main switch, the power stage being configured to convert an input voltage to an output voltage;
    a current sense circuit coupled to the power stage to generate a current sense signal indicative of the current flowing through the main switch;
    an error amplifier having a first input terminal configured to receive a feedback signal indicative of the output voltage, a second input terminal configured to receive a first reference signal, and an output terminal configured to generate a compensation signal based on the feedback signal and the first reference signal;
    a PWM comparator having a first input terminal coupled to the current sense circuit to receive the current sense signal, a second input terminal coupled to the output terminal of the error amplifier to receive the compensation signal, and an output terminal configured to generate a PWM signal based on the current sense signal and the compensation signal;
    an OFF time controller having a first input terminal configured to receive the input voltage, a second input terminal configured to receive the output voltage, and an output terminal configured to generate an OFF time control signal based on the input voltage and the output voltage to control the OFF time of the main switch; and
    a logic circuit having a first input terminal coupled to the output terminal of the PWM comparator to receive the PWM signal, a second input terminal coupled to the output terminal of the OFF time controller to receive the OFF time control signal, and an output terminal configured to output a switching signal based on the PWM signal and the OFF time control signal to control the main switch.

2. The switching converter with adaptive OFF time control of claim 1, wherein the power stage comprises a BUCK converter, and the OFF time of the main switch set by the OFF time controller is inversely proportional to the input voltage and directly proportional to the difference between the input voltage and the output voltage.

3. The switching converter with adaptive OFF time control of claim 2, wherein the first reference signal increases gradually, and wherein the time derivative of the reference signal is substantially zero when the output voltage substantially reaches the input voltage.

4. The switching converter with adaptive OFF time control of claim 3, further comprising a reference generator configured to generate the first reference signal, wherein the reference generator comprises:
    an exponential signal generator having an output terminal configured to generate an exponential signal;
    a linear signal generator having an output terminal configured to generate a linear signal with linear slope; and
    a selector having a first input terminal coupled to the output terminal of the exponential signal generator to receive the exponential signal, a second input terminal coupled to the output terminal of the linear signal generator to receive the linear signal and, an output terminal configured to select the smaller one as the first reference signal based on the exponential signal and the linear signal.

5. The switching converter with adaptive OFF time control of claim 2, wherein the duty cycle of the main switch gradually increases from 0% to 100%, and the duty cycle remains at 100% after the output voltage reaches the input voltage.

6. The switching converter with adaptive OFF time control of claim 1, further comprising an OCP (Over Current Protection) circuit having a first input terminal coupled to the output terminal of the current sense circuit to receive the current sense signal, a second input terminal configured to receive a current limit signal, and an output terminal configured to generate an OCP signal based on the current sense signal and the current limit signal; wherein
    the logic circuit further has a third input terminal coupled to the OCP circuit to receive the OCP signal, wherein the logic circuit generates the switching signal based on the PWM signal, the OCP signal and the OFF time control signal to control the main switch.

7. The switching converter with adaptive OFF time control of claim 1, wherein the power stage comprises a BOOST converter, and the OFF time of the main switch set by the OFF time controller is inversely proportional to the output voltage and directly proportional to the input voltage.

8. The switching converter with adaptive OFF time control of claim 1, wherein the OFF time controller comprises:
    a first current source configured to provide a charge current directly proportional to the input voltage;
    a first capacitor having a first terminal coupled to the first current source to receive the charge current and a second terminal coupled to a ground reference node;
    a first switch having a first terminal coupled to the first current source, a second terminal coupled to the ground reference node and a control terminal coupled the output terminal of the logic circuit to receive the switching signal; and
    an OFF time control comparator having a first input terminal coupled to the first terminal of the first capacitor, a second input terminal configured to receive a second reference signal directly proportional to the difference between the input voltage and the output voltage, and an output terminal configured to generate the OFF time control signal based on the comparison of a voltage across the first capacitor and the second reference signal.

9. A switching converter with adaptive OFF time control, comprising:
    a power stage comprising a main switch, the power stage configured to convert an input voltage to an output voltage;
    a current sense circuit having an input terminal coupled to the main switch, and an output terminal configured to generate a current sense signal indicative of a current flowing through the main switch;
    a PWM generator having a first input terminal configured to receive a feedback signal indicative of the output voltage of the switching converter, a second input terminal configured to receive the current sense signal, and an output terminal configured to generate a PWM signal based on the feedback signal and the current sense signal;

an OFF time controller having a first input terminal configured to receive the input voltage, a second input terminal configured to receive the output voltage, and an output terminal configured to generate an OFF time control signal based on the input voltage and the output voltage; and a logic circuit having a first input terminal coupled to the output terminal of the PWM generator to receive the PWM signal, a second input terminal coupled to the output terminal of the OFF time controller to receive the OFF time control signal, and an output terminal configured to output a switching signal based on the PWM signal and the OFF time control signal to control the main switch.

10. The switching converter with adaptive OFF time control of claim 9, further comprising an OCP (Over Current Protection) circuit, wherein the OCP circuit having a first input terminal configured to receive the current sense signal, a second input terminal configured to receive a current limit signal, and an output terminal configured to generate an OCP signal based on the current sense signal and the current limit signal; wherein the logic circuit further has a third input terminal coupled to the output terminal of the OCP circuit to receive the OCP signal, and wherein based on the PWM signal, the OFF time control signal and the OCP signal, the logic circuit generates the switching signal at the output terminal to control the main switch.

11. The switching converter with adaptive OFF time control of claim 9, wherein the power stage comprises a BUCK converter, and the OFF time of the main switch set by the OFF time controller is inversely proportional to the input voltage and directly proportional to the difference between the input voltage and output voltage.

12. The switching converter with adaptive OFF time control of claim 9, wherein the power stage comprises a BOOST converter, and the OFF time of the main switch set by the OFF time controller is inversely proportional to the output voltage and is directly proportional to the input voltage.

13. The switching converter with adaptive OFF time control of claim 9, wherein the OFF time controller comprises:

a first current source having an input terminal configured to receive a power supply voltage, and an output terminal configured to provide a charge current directly proportional to the input voltage;

a first capacitor having a first terminal coupled to the output terminal of the first current source to receive the charge current and a second terminal coupled to a ground reference node;

a first switch having a first terminal coupled to the output terminal of the first current source, a second terminal coupled to the ground reference node and a control terminal coupled the output terminal of the logic circuit to receive the switching signal; and an OFF time control comparator having a first input terminal coupled to the first terminal of the first capacitor, a second input terminal configured to receive a second reference signal directly proportional to the difference between the input voltage and the output voltage, and an output terminal configured to generate the OFF time control signal based on the comparison of a voltage across the first capacitor and the second reference signal.

14. A method for controlling a switching converter, wherein the switching converter comprises a power stage having a main switch, and the power stage is configured to convert an input voltage into an output voltage, the method comprises:

generating a current sense signal based on a current flowing through the main switch;

generating a compensation signal based on a first reference signal and a feedback signal indicative of the output voltage;

comparing the current sense signal with the compensation signal;

turning OFF the main switch when the current sense signal reaches the compensation signal;

generating a time threshold based on the input voltage and output voltage; and turning ON the main switch when the OFF time of the main switch reaches the time threshold.

15. The method of claim 14, further comprising:

comparing the current sense signal with a current limit signal; and turning OFF the main switch when the current sense signal reaches the current limit signal.

16. The method of claim 14, wherein the power stage comprises a BUCK converter, the time threshold is inversely proportional to the input voltage and directly proportional to the difference between the input voltage and output voltage.

17. The method of claim 16, wherein the reference signal is gradually increased, and wherein the time derivative of the reference signal is substantially zero when the output voltage substantially reaches the input voltage.

18. The method of claim 16, further comprising:

generating an exponential signal;

generating a linear signal with linear slope; and selecting the smaller one of the exponential signal and the linear signal as the first reference signal.

19. The method of claim 14, wherein the power stage comprises a BOOST converter, the time threshold is inversely proportional to the output voltage and directly proportional to the input voltage.

20. The method of claim 14, wherein the duty cycle of the main switch gradually increases from 0% to 100%, and the duty cycle remains at 100% after the output voltage reaches the input voltage.

* * * * *